US008429255B1

(12) United States Patent
Khan et al.

(10) Patent No.: US 8,429,255 B1
(45) Date of Patent: Apr. 23, 2013

(54) DETERMINING REORDER COMMANDS FOR REMOTE REORDERING OF POLICY RULES (75) Inventors: Kamil Khan, Bangalore (IN); Firdousi Farozan Zackariya, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 352 days.

(21) Appl. No.: 12/694,983

(22) Filed: Jan. 27, 2010

(51) Int. Cl.
*G06F 15/177* (2006.01)
(52) U.S. Cl.
USPC .......................................... 709/221; 709/220
(58) Field of Classification Search .................. 709/220, 709/221
See application file for complete search history.

(56) References Cited

U.S. PATENT DOCUMENTS

| 7,062,546 | B1 | 6/2006 | Kolar et al. | |
| 8,145,623 | B1 * | 3/2012 | Mehta et al. | 707/713 |
| 2004/0205539 | A1 * | 10/2004 | Mak et al. | 715/511 |

OTHER PUBLICATIONS

Jupiter Networks, Network and Security Manager Adminstration Guide Release 2008.1, Revision 2, Aug. 1, 2008, pp. 129, 196, 211, 214, 215, 239, 420, 462, 627.*
U.S. Appl. No. 12/510,062, by Donghua Deng, filed Jul. 27, 2009.
Juniper Networks, "Juniper Networks Network and Security Manager Administration Guide Release 2009.1, Revision 1," Aug. 24, 2009, 1,001 pp.

* cited by examiner

*Primary Examiner* — Yves Dalencourt
*Assistant Examiner* — Hee Soo Kim
(74) *Attorney, Agent, or Firm* — Shumaker & Sieffert, P.A.

(57) ABSTRACT

Techniques are described for determining reorder commands for updating policy rules in a managed network device based on a longest common subsequence between two lists of policy rules. For example, as described herein, a network management device determines a longest common subsequence of a source list comprising a plurality of policy rules in a first ordering that corresponds to a current policy configuration of a managed network device and of a destination list comprising the plurality of policy rules in a second ordering that corresponds to an updated ordering for the policy configuration. The network management device then iterates through the destination list to generate commands that, when executed by the managed network device, move policy rules in the destination list that are not members of the longest common subsequence to positions in the policy configuration relative to policy rules that are members of the longest common subsequence.

17 Claims, 7 Drawing Sheets

DETERMINING REORDER COMMANDS FOR REMOTE REORDERING OF POLICY RULES

TECHNICAL FIELD

The invention relates to computer networks, and, more particularly, to techniques for configuring policies of network devices.

BACKGROUND

A packet-based computer network is a group of network devices, such as routers, switches, endpoint devices, and servers, which are interconnected in such a manner as to permit the exchange of network packets between any two or more of the network devices. Network devices typically include a mechanism, referred to herein as a management interface, for directly or remotely configuring the network devices. By interacting with the management interface, a device management system can configure a network device with a policy having a number of policy rules that each specify an action for the device to perform on the occurrence of some condition. For example, a security policy rule may cause a network device to drop packets that match certain criteria specified by the rule, such as packets received from a particular source. In many instances, a policy may define a number of different rules, where each of the rules specify certain matching criteria and one or more actions to take in the event the criteria is met. The network device applies the rules in accordance with a defined ordering specified by the policy. In many instances, the ordering of the policy rules within a policy affects the operation and performance of a network device that applies the policy.

SUMMARY

In general, the invention is directed to techniques for efficiently updating policy configurations for network devices. More specifically, techniques are described for reducing the number of commands needed to reorder an ordered list of policy rules for a network device to an updated ordering.

For example, an administrator for the network devices in an enterprise uses a configuration management application of a device management system to interface with and manage the behavior of the network devices. In the normal course, the administrator interacts with the device management system to specify and install configuration data within the network devices to configure the network devices within the network according to a desired operational scheme. For example, a network device may be configured to accord with certain policies, which may include security, routing, filtering and QoS policies, network address translation (NAT) rules, access control policies, and other configuration data.

The device management system presents an interface to an administrator that lists a cached version of the policy rules for a network device in an ordered list according to their order of execution. In many cases, the execution order of policy rules affects device behavior. The interface therefore enables the administrator to insert additional rules, delete rules, and modify the execution order of the rules in the current ordered policy to increase robustness or efficiency or to otherwise better enable the network device to carry out various network objectives. The administrator assembles the desired policy configuration for the device to produce an updated list of policy rules and directs the device management system to update the network device to conform the device configuration to the updated policy.

The device management system determines a longest common subsequence (LCS) of policy rules shared by the current policy and the updated policy, where the LCS represents the longest subset of policy rules that have the same ordering (not necessarily contiguous) in both the current policy and the updated policy. The device management system establishes the LCS as a pivotal sequence and generates reordering commands that, when sent to the network device, cause the network device to move individual policy rules in the current policy to a new position relative to the LCS in the current ordered, thereby conforming the device configuration to the updated policy.

In one embodiment, the invention is directed to a method comprising the steps of receiving an updated policy for a currently configured policy for a managed network device, wherein the currently configured policy comprises a plurality of policy rules in a first ordering and the updated policy comprises the plurality of policy rules in a second ordering, and determining a longest common subsequence of a source list comprising the plurality of policy rules in the first ordering and of a destination list comprising the plurality of policy rules in the second ordering, wherein the longest common subsequence is a longest subset of the plurality of policy rules that have a same ordering in both the source list and the destination list. The method additionally comprises the steps of generating, based on the longest common subsequence, one or more policy configuration commands that, when executed by the managed network device, conform the currently configured policy to the updated policy, and sending the policy configuration commands to the managed network device.

In another embodiment, the invention is directed to a network management device comprising a network interface that receives and sends network packets. The network management device further comprises a command generation module that executes on a processor to generate one or more policy configuration commands for a managed network device, wherein the policy configuration commands direct the managed device to conform a currently configured policy for the managed device to an updated policy for the managed device, wherein the currently configured policy comprises a plurality of policy rules in a first ordering and the updated policy comprises the plurality of policy rules in a second ordering. The command generation module comprises a longest common subsequence module that determines a longest common subsequence of a source list comprising the plurality of policy rules in the first ordering and of a destination list comprising the plurality of policy rules in the second ordering, wherein the longest common subsequence is a longest subset of the plurality of policy rules that have a same ordering in both the source list and the destination list, and generates reordering ones of the one or more policy configuration commands for the command generation module based on the longest common subsequence. The network management device further comprises an element manager that sends the policy configuration commands to the managed network device via the network interface.

In another embodiment, the invention is directed to a computer-readable medium containing instructions. The instructions cause a programmable processor to receive an updated policy for a currently configured policy for a managed network device, wherein the currently configured policy comprises a plurality of policy rules in a first ordering and the updated policy comprises the plurality of policy rules in a second ordering. The instructions further cause the programmable processor to generate one or more policy configuration commands that, when executed by the managed network device, conform the currently configured policy to the updated policy, and to determine a longest common subsequence of a source list comprising the plurality of policy rules in the first ordering and of a destination list comprising the plurality of policy rules in the second ordering, wherein the longest common subsequence is a longest subset of the plurality of policy rules that have a same ordering in both the source list and the destination list. The instructions further cause the programmable processor to send the policy configuration commands to the managed network device.

The techniques described may provide one or more advantages. For example, because many network devices often include hundreds or even thousands of policy rules, even minor changes in a policy configuration can require numerous reorder commands that consume significant network and device resources when the updates are performed by an inefficient configuration update process. In some situations, a large amount of reorder commands can even cause a device to crash or otherwise be rendered inoperable for a time. Using the techniques described herein may reduce a number of reorder commands needed and may therefore reduce the amount of network resources needed to reconfigure a device. For instance, in a remote-configuration situation, the device management system can transmit a reduced number of reorder commands in fewer network packets. In addition, fewer commands can typically be executed more quickly by a device than a greater number of commands, which results in a more rapid device update and more rapid conformity to one or more network objectives. As another example, in some network devices, each reorder command executed by a network device causes the network device to begin operating according to the new ordering. As a result, until the final reorder command for an updated policy is executed by the network device, the device is operating according to an intermediate configuration state that may cause indeterminate device behavior. Reducing the number of reorder commands using the techniques described may reduce the time that the device that receives and executes the commands is operating according to an intermediate configuration state.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
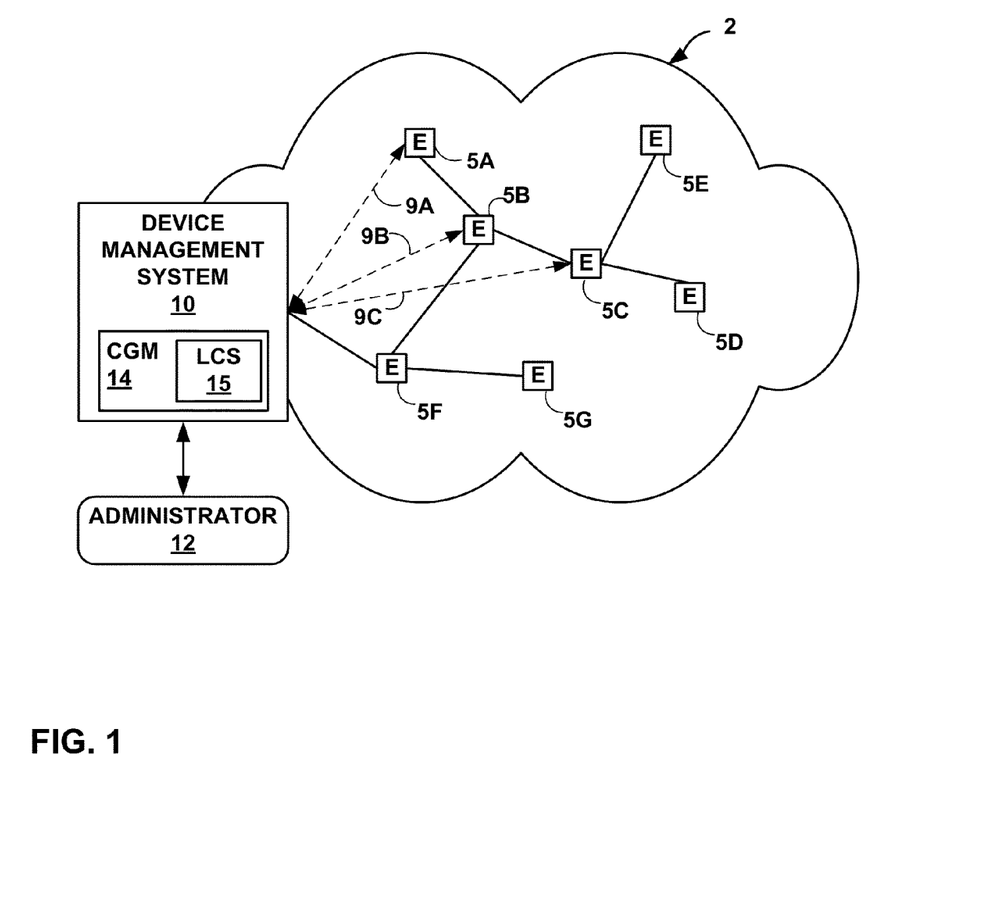
FIG. 1 is a block diagram illustrating enterprise elements managed with a device management system according to the techniques described.

FIG. 1 is a block diagram illustrating elements of an enterprise network 2 that are managed using a device management system 10. Managed elements 5A-5G (collectively, "elements 5") of enterprise network 2 are existing network devices interconnected via communication links to form a communication topology in order to exchange resources and information. Elements 5 may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 5 may be physical links (e.g., optical, copper, and the like) or wireless. Enterprise network 2 may be coupled to one or more additional private or public networks, e.g., the Internet (not shown).

Device management system 10 is communicatively coupled to elements 5 via enterprise network 2. Device management system 10 may be coupled either directly or indirectly connected to the various elements 5. Once elements 5 are deployed and activated, administrator 12 may use device management system 10 to manage the network devices using a device management protocol. In general, device management system 10 uses a network management protocol designed for management of configuration data within managed network elements 5, such as the Simple Network Management Protocol (SNMP) protocol or the Network Configuration Protocol (NETCONF) protocol or a derivative thereof, such as the Juniper Device Management Interface, to perform the configuration. Using the network management protocol, device management system 10 may establish configuration sessions with one or more of elements 5 that allows device management system 10 to traverse and modify configuration data within each of managed elements 5. In the example of FIG. 1, device management system 10 is illustrated as participating in configuration sessions 9A-9C ("configuration sessions 9") with elements 5A-5C, respectively.

In common practice, device management system 10 and elements 5 managed by device management system 10 are centrally maintained by an IT group of the enterprise and are collectively referred to as an element management system (EMS) or a network management system (NMS). Administrator 12 interacts with device management system 10 to remotely monitor and configure elements 5. For example, administrator 12 may receive alerts from device management system 10 regarding any of elements 5, view configuration data of elements 5, modify the configurations data of elements 5, add new network devices to enterprise network 2, remove existing network devices from enterprise network 2, or otherwise manipulate the enterprise network 2 and network devices therein. Although described with respect to an enterprise network, the techniques of this invention are applicable to other network types, public and private, including LANs, VLANs, VPNs, and the like.

Administrator 12 uses device management system 10 to configure elements 5 with policy rules that specify certain operational characteristics that further the objectives of administrator 12. For example, administrator 12 may, using policy rules, specify for an element 5 a particular operational policy regarding security, device accessibility, traffic engineering, quality of service (QoS), network address translation (NAT), packet filtering, packet forwarding, rate limiting, or other policies. While described with respect to policy rules, the techniques of this disclosure may be applicable to other aspects of network devices, including modifying routing tables, or other aspects involving updating an ordered list of entries.

Managed network elements 5 maintain data for a particular policy (e.g., security) as an ordered list of policy rules that are each keyed to a unique identifier. Upon occurrence of a triggering event in one of managed network element 5, such as the receipt of a packet, the element sequentially traverses the ordered list to determine the first policy rule in the list that applies to the triggering event data. If the element finds an applicable policy rule, the element proceeds to execute the specified action (e.g., drop the packet, update a traffic log, or redirect the packet for further analysis and inspection).

Device management system 10 provides an interface that administrator 12 uses to modify various policies of elements 5. For example, the interface enables administrator 12 to delete or change the ordering of existing policy rules and to insert new rules in a current policy of one of elements 5 to produce an updated policy for the element. Upon producing the updated policy, administrator 12 directs device management system 10 to modify the configuration of the element based on the updated policy. In some aspects, device management system 10 automatically modifies policies of elements 5 as a response to, for example, changing network conditions.

In the example of FIG. 1, device management system 10 comprises command generation module 14 ("CGM 14"), which generates, based on updated policies produced by administrator 12, a series of commands for modifying policies in one or more of elements 5. Each of the commands may direct one of elements 5 to insert a new rule into a current policy, delete an existing rule, or move an existing rule to a new relative position in the ordered list of rules that make up the policy.

In accordance with the techniques of this disclosure, command generation module 14 comprises longest common subsequence (LCS) module 15 that command generation module 14 uses to determine, given a current policy and an updated policy, a set of reorder commands that will conform the current policy to the updated policy. As described in detail below, LCS module 15 uses an LCS algorithm to determine a LCS of rules for the current policy and the updated policy. The LCS then functions as a pivotal subsequence of policy rules. Starting with the first rule in the updated policy, LCS module 15 determines reorder commands that move rules from the updated policy that are not included in the LCS to a location, relative to rules in the LCS, in the ordered list for the policy. LCS module 15 thus generates a number of reorder commands to reorder the policy rules in a currently configured policy of one of elements 5 to match the ordering of the corresponding updated policy specified by administrator 12. In some instances, the number of commands generated by LCS module 15 is optimal. That is, the number of commands generated is the minimum number that is capable of conforming the current policy to the updated policy. Command generation module 14 separately handles generation of insert and delete commands.

After command generation module 14 generates commands for conforming a policy for one of elements 5 to an updated policy specified by administrator 12, device management system 10 uses a configuration session (e.g., one of configuration sessions 9) to send the commands to the intended one of elements 5. Upon receiving the commands, the intended one of elements 5 executes the commands to update the policy. In some instances, device management system 10 sends the commands to multiple ones of elements 5 in order to update multiple elements in parallel.

Generating commands in the manner described may reduce the number of commands required to place managed network elements 5 in their intended configuration states. Because each of managed network elements 5 may contain hundreds or even thousands of policy rules in a single policy, LCS module 15 may significantly reduce the number of commands required to modify a currently configured policy for one of managed network elements 5. Reducing the number of commands have a number of salutary effects, including a reduction in the amount of resources required to transmit commands through enterprise network 2, a reduction in the amount of time that elements 5 spend in an intermediate, indeterminate configuration state, and/or an increase in the amount of computational or other resources that elements 5 can use to provide core functionality (e.g., security, routing, NAT).

Figure 2:
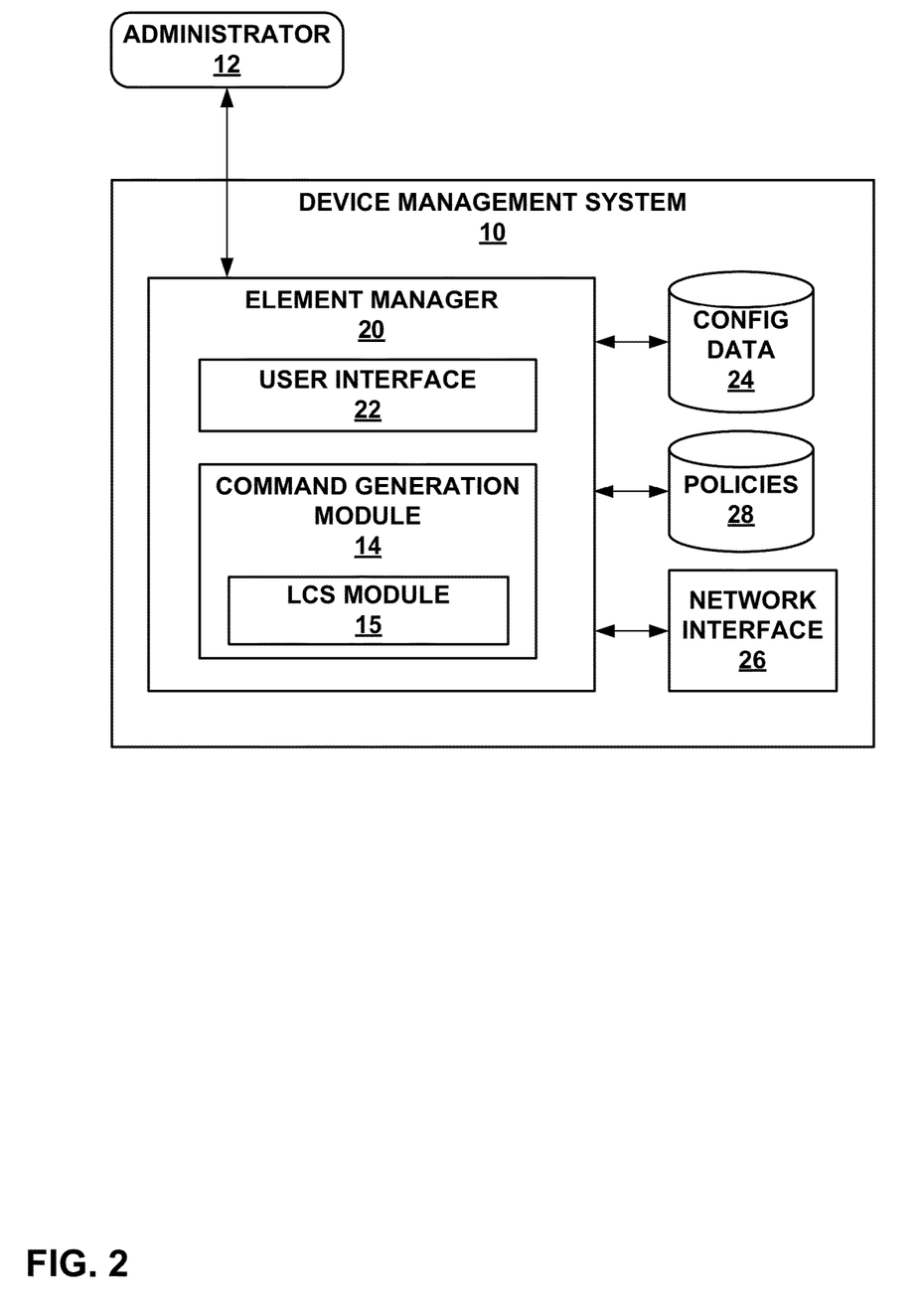
FIG. 2 is a block diagram illustrating an example device management system modified to generate commands for reordering a list of policy rules in accordance with the disclosures herein.

FIG. 2 is a block diagram illustrating one example of device management system 10 in further detail. In this example, administrator 12 interacts with element manager 20 of device management system 10 via user interface 22 to locally maintain and modify configuration data and network device policies, and to install the configuration data and policies to the appropriate network device using a device management protocol. User interface 22 may include a command-line interface (CLI), a graphical user interface (GUI), a file interface that can receive data files that include policy rules or configuration data, or another interface that enables administrator 12 to interact with element manager 20.

Device management system 10 further includes databases of device policies 28 and configuration data 24 (illustrated as "config data 24") that store and maintain policies and configuration data, respectively, for elements 5 of enterprise network 2. In some embodiments, device policies 28 are stored within a separate policy server (not shown), and device management system 10 queries the policy server to update, retrieve, and manage (e.g., modify) the policies. In some embodiments, device policies 28 are stored only by the managed devices, e.g., elements 5, and device management system 10 queries the managed devices to update, retrieve, and manage (e.g., modify) the policies. Device policies 28 may include policies for a number of different policy areas, e.g., security, routing, and QoS. Examples of configuration data for network devices that process and forward network traffic are shown in U.S. Pat. No. 7,062,546, the content of which is incorporated herein in its entirety. Further details on management systems and the application of schemas for verification of configuration data are found in U.S. application Ser. No. 12/510,062, the entire contents of which is incorporated herein.

In general, a policy is a set of one or more policy rules that specify conditions as well as corresponding actions that cause a network device to operate in a particular manner upon satisfaction of the condition. Conditions may define match conditions for packets and packet flows within enterprise network 2. A condition may apply to any level of Open Systems Interconnect (OSI) model or the Transmission Control Protocol/Internet Protocol (TCP/IP) model. For example, a condition may match a particular transport protocol or layer-two (L2) parameters (e.g., source or destination port), a particular network protocol or layer three (L3) parameters (e.g., source or destination network address, a packet length, header information), an application protocol or application-layer (L7) parameter or pattern (e.g., a specific HTML pattern within the payload data to detect malicious byte sequences) and various other packet classifications. Conditions may also be interface-specific, such as by specifying specific physical or logical interfaces on which to apply the policies. Corresponding actions for the network device to perform upon occurrence of a condition concern the action the network device takes with respect to the packet or packet flow. These may include, e.g., filtering, forwarding, rate limiting, assigning to a forwarding class, mirroring for traffic analysis, NAT translation, and the like.

Element manager 20 provides methods for managing a network of devices, such as enterprise network 2, by exchanging messages with the devices via network interface 26. In general, such messages are exchanged as part of a configuration session (e.g., configuration session 9A involving element 5A) established using a network configuration protocol, such as SNMP. During a configuration session with a managed device, for example, element manager 20 exchanges commands, configuration-related data, and/or policies with the managed device. Administrator 12 may interface with element manager 20 via user interface 22 in order to perform policy and configuration management tasks. User interface 22 provides methods for deleting, inserting, and changing the order of policy rules in a policy.

In some instances, element manager 20 automatically performs policy and configuration management tasks (e.g., via scripts) in order to rapidly handle policy-related issues or to relieve the administrative burdens of managing enterprise network 2. For example, element manager 20 may periodically poll elements 5 to determine whether the respective policies are consistent with the requirements of enterprise network 2. As one example, element manager 20 may require elements 5 to include a policy rule that denies network access to all packets originating from a particular network source. If, in response to a query from element manager 20, element 5A indicates that the policy rule is not installed on element 5A, element manager 20 automatically sends a command via a configuration session directing element 5A to install the policy rule.

In some embodiments, element manager 20 is an extension of the Juniper Networks Network and Security Manager (NSM) application as described in Juniper Networks, "Juniper Networks Network and Security Manager Administration Guide Revision 2009.1," August 2009, available at http://www.juniper.net/techpubs/software/management/security-manager/nsm2009_1/nsm-admin-guide.pdf, which is incorporated herein by reference in its entirety.

Element manager 20 updates the policy data in device policies 28 in accordance with modifications made by administrator 12 to ensure that the policy data is consistent with the operational policies for the corresponding one or more of elements 5. If one of elements 5 were to fail, element manager 20 pushes the policy data in device policies 28 to a replacement for the failed element in order to restore the replacement to the most recent policy configuration. In some instances, element manager 20 may perform bulk policy configuration of multiple elements 5. That is, element manager 20 may push a set of policy rules sequentially or simultaneously to multiple elements 5 via enterprise network 2.

As described above, a policy for one of elements 5, e.g., element 5A, comprises an ordered list of policy rules that are each keyed to an identifier unique within the ordered list. In the example of FIG. 2, element manager 20 may delete, insert, and/or change the order of policy rules in a policy in device policies 28 for element 5A in order to specify certain operational characteristics for element 5A that further network objectives. That is, element manager 20 may modify the component policy rules or the arrangement thereof of a policy for element 5A to produce an updated policy for element 5A. In some instances, the policy is retrieved from device policies 28 or a policy server and temporarily stored in element manager 20 for manipulation, and element manager 20 may later update device policies 28 or the policy server with an updated policy.

Element manager 20 comprises command generation module 14 that generates policy configuration commands for modifying policies in elements 5 based on updated policies produced by element manager 20. Exemplary command generation module 14 may generate: an "INSERT [rule]" command to insert a policy rule (rule) at the end of the ordered list that forms a particular policy; a "DELETE" command to remove, provided a unique identifier, the policy rule in the policy that is keyed to the unique identifier; and a "MOVE" command to move a policy rule before ("BEFORE") or after ("AFTER") another policy rule in the ordered list. Policy rules are referenced by the unique identifiers to which they are keyed, referred to hereinafter as policy rule identifiers. The full syntax of a MOVE command, in this example, is "MOVE<id1>[BEFORE|AFTER]<id2>", which causes a receiving one of elements 5 to move the rule identified by id1 to a position relative to the rule identified by id2. As an example of a MOVE command, if administrator 12 specifies an updated policy that modifies the ordering of the policy rule such that a policy rule with ID=2 is moved to immediately follow a policy rule with ID=5, then command generation module 14 generates the command "MOVE 2 AFTER 5". In other embodiments, the particular form of a move command may vary. For example, an embodiment may provide two commands, "MOVEAFTER" and "MOVEBEFORE", which operate on arguments specifying policy rule identifiers.

In accordance with the techniques of this disclosure, command generation module 14 comprises LCS module 15 that determines a set of MOVE commands for a policy currently configured on one of elements 5 (e.g., element 5A) that, when sent to the element, causes the element to rearrange the policy rules of the policy. In some instances, the commands generated by LCS module 15 conform the arrangement of the policy rules to the ordering specified by an updated policy produced by element manager 20 in the fewest possible number of MOVE commands.

LCS module 15 receives two ordered lists of policy rule identifiers from command generation module 14. The first list comprises the ordered list of policy rule identifiers for a policy currently configured on one of elements 5 and is referred to hereinafter as the "source list." The second list comprises the ordered list of policy rule identifiers for an updated policy, as produced by element manager 20 for the currently configured policy, and is referred to hereinafter as the "destination list."

In exemplary device management system 10, command generation module 14 handles INSERT and DELETE commands after exercising LCS module 15. As a result, the source list and destination list contain identical sets of policy rules in various orderings. That is, supposing that set A comprises all policy rules in the source list and set B comprises all policy rules in the destination list, then $A \subseteq B$ and $B \subseteq A$. In some instances, the source list and destination list may each contain different sets of policy rules. That is, the destination list may include policy rules that are not members of the source list, and vice versa.

Provided a source list and destination list, LCS module 15 first determines a longest common subsequence (LCS) of the two lists. In general, a LCS for two ordered lists is the longest subset of elements that have the same ordering, not necessary contiguous, in both of the lists. The LCS need not be contiguous. Accordingly, a LCS for the source list and destination list is the longest subsequence of policy rules that have the same ordering in both lists. The source list and destination list may have multiple longest common subsequences.

As one example, consider a source list of policy rules 1-10 ordered as follows:
[1 2 3 4 5 6 7 8 9 10]
and a destination list of identical policy rules 1-10 ordered as follows:
[8 9 10 7 6 2 3 1 4 5]
An LCS for these exemplary lists is [2 3 4 5]. In this example, the preceding LCS is the only LCS for the two lists, for there is no other common subsequence of equal or greater length.

Exemplary LCS module 15 uses a dynamic programming algorithm to determine an LCS for the source list and destination list. In generally, the dynamic programming LCS algorithm divides the problem of determining an LCS into decreasingly complex levels of overlapping subproblems, solving the subproblems in an order of increasing complexity, and saving the solutions to subproblems in order to make the solutions available for more complex/higher subproblem levels. The dynamic programming solution for determining an LCS between two lists or equal length n runs in $O(n^2)$. Accordingly, the dynamic programming algorithm used to determine an LCS for the source list and destination list runs has order of $n^2$ complexity in the exemplary embodiment. In some embodiments, LCS module 15 uses other methods to determine an LCS for the source list and destination list, such as a naïve recursive method.

After determining an LCS for the provided source list and destination list, LCS module 15 uses the LCS as a basis for rearranging the policy rules. LCS module 15 generates MOVE commands for each of the policy rules in the destination list that are not in the LCS ("non-LCS policy rules") in order to move the non-LCS policy rules to a position relative to policy rules that are in the LCS ("LCS policy rules"). Specifically, LCS module 15 iterates, in order, through the destination list to identify non-LCS policy rules. Upon iterating to a non-LCS policy rule, LCS module 15 generates a MOVE command to move the rule to a position in the ordering relative to the first LCS policy rule that is ordered subsequent to the rule in the destination list. If no LCS policy rules follow the rule in the destination list, LCS module 15 instead generates a MOVE command to move the rule to a position in the ordering relative to either the last LCS policy rule in the destination list or a previous policy rule in the destination list. The operation of exemplary LCS module 15 is described below with respect to FIGS. 6A-6B in further detail.

The iteration process performed by LCS module 15 runs with O(n) complexity on a destination list and source list of size n, leading to an overall complexity of $O(n^2)+O(n)$ that is asymptotically dominated by $O(n^2)$. In addition, because LCS module 15 generates a policy configuration command for each non-LCS policy rule, the total number of commands, K, generated is calculated according to the formula K=n−length (LCS).

By executing the MOVE commands generated by LCS module 15 for a particular source list and destination list, a managed device, such as one of elements 5, can rearrange a currently configured policy that includes policy rules arranged similarly to the source list to produce an updated policy with policy rules arranged similarly to the destination list.

Command generation module 14 uses the MOVE commands generated by LCS module 15 as a basis and adds INSERT and DELETE commands as necessary to further conform a currently configured policy on one or more of elements 5 to the updated policy produced by element manager 20. In some embodiments, command generation module 14 generates DELETE commands prior to sending a source list and destination list to LCS module 15. For exemplary elements 2, an INSERT [rule] command causes elements 2 to insert rule at the end of an ordered list of policy rules. For inserting a policy rule at a particular location in a policy, therefore, exemplary command generation module 14 produces both an INSERT command to first insert the rule and a MOVE command to shift the inserted rule to the appropriate position specified by the updated policy.

After command generation module 14 generates the commands needed to conform a currently configured policy of one or more of elements 5 to an updated policy specified by element manager 20, command generation module 14 sends the commands to the appropriate ones of elements 5. The receiving elements execute the commands to update the policies.

Generating MOVE commands using LCS module 15 according to techniques herein described may reduce, in comparison with conventional techniques, the number of MOVE commands needed to conform a currently configured policy to an updated policy. For enterprise network 2, this may reduce the number of packets required to transmit all necessary commands to one or more of managed elements 5. Furthermore, fewer commands tends to reduce the amount of time required to update one or more of managed elements 5 and also tends to reduce the likelihood of a device or network outage.

Element manager 20, including user interface 22, command generation module 14 and LCS module 15, may be implemented as program code (i.e., executable software instructions) that executes within an operating environment of device management system 10. Device management system 10 may, for example, include one or more microprocessors for executing instructions stored in a tangible computer-readable storage medium.

Figure 3:
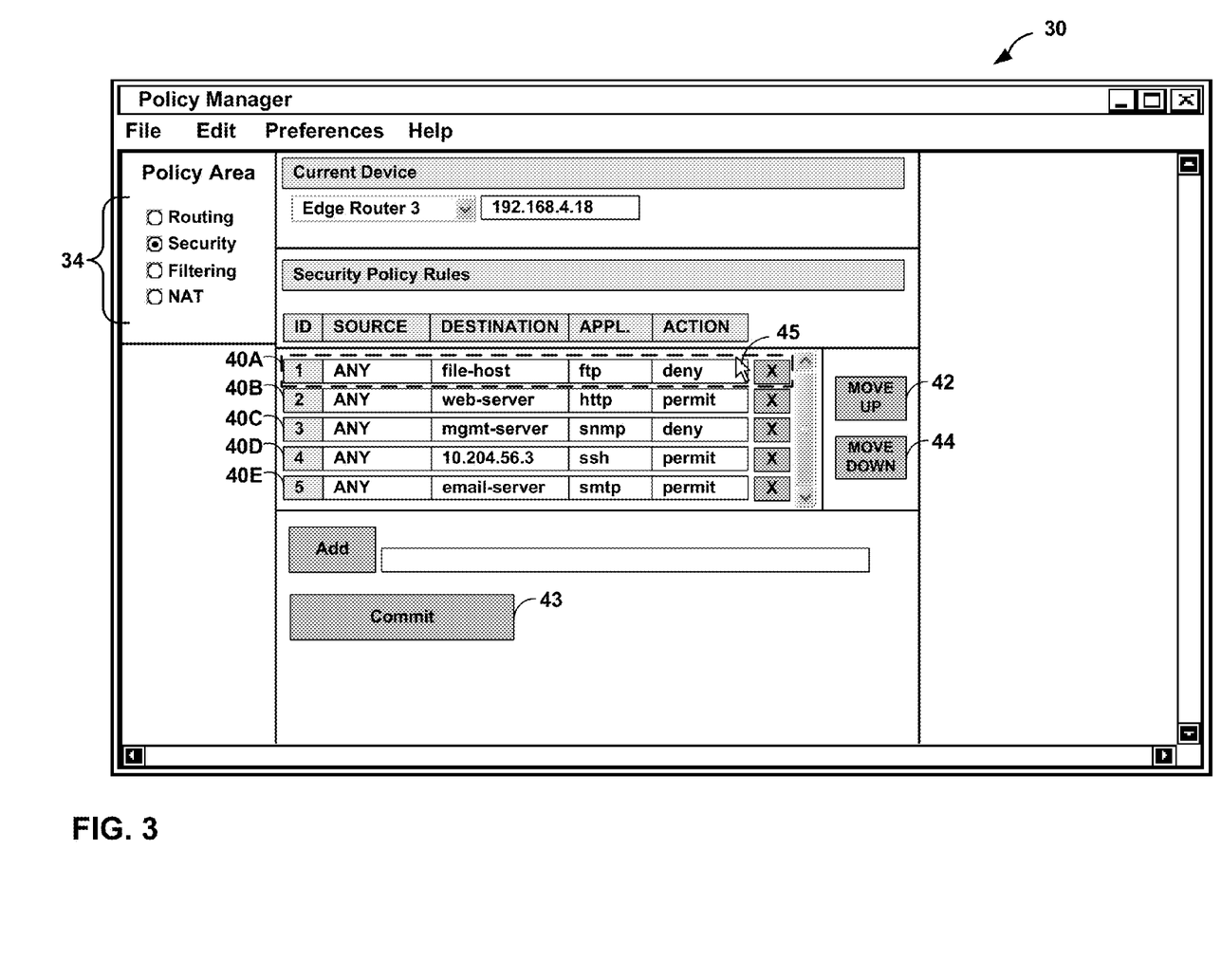
FIG. 3 is an exemplary screenshot of a policy manager application running on a device management system that illustrates a list of policy rules.

FIG. 3 illustrates an exemplary screenshot 30 for user interface 22 of element manager 20 of the device management system 10 of FIG. 2. Exemplary user interface 22 presents policy rules according to categories 34. Screenshot 30 illustrates an ordered list of security policy rules 40A-40E ("security policy rules 40") that comprise the security policy currently configured on the current one of elements 5 ("Edge Router 3") being managed by element manager 20. Other policies configured include, for example, routing, filtering, and NAT policies. Each of security policy rules 40A-40E is associated with a unique identifier 1-5, respectively. User interface 22 illustrates the unique identifier for security policy rules 40 in the "ID" column. The illustrated security polices rules 40 are exemplary. The security policy and other policies for one of elements 5, in some instances, comprise any number and variety of policy rules.

User interface 22 comprises move up button 42 and move down button 44 that enable a user, having selected one of security policy rules 40A-40E with mouse point 45, to alter the position of the selected policy rule within the ordered list of the security policy. In screenshot 30, a user (such as administrator 12) has selected security policy rule 40A having ID=1. By pressing move down button 44, the user can move security policy rule 40A down the ordered list to a new position. A user may decide to alter the ordering of policies for a number of reasons. These reasons may include, for example, improving the efficiency of the application of a policy to received network packets and eliminating an instance of rule shadowing in a current configuration.

Figure 4:
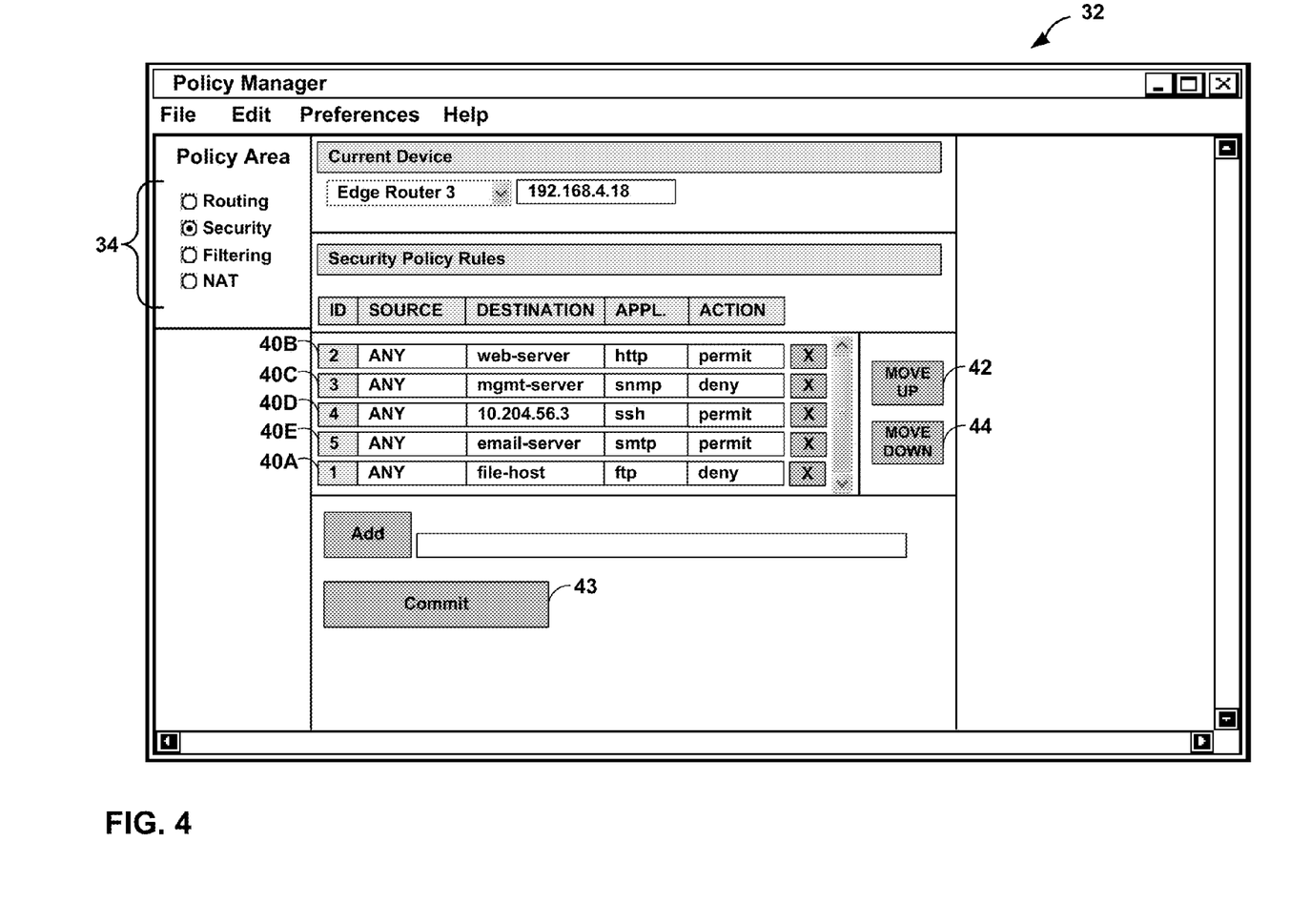
FIG. 4 is an exemplary screenshot of a policy manager application running on a device management system that illustrates a modified list of policy rules.

FIG. 4 is illustrates an additional exemplary screenshot 32 that shows security policy rules 40 arranged into an updated ordering. More specifically, security policy rule 40A occupies the last position in the ordered list of the security policy, in contrast to the currently configured ordering of security policy rules 40 as illustrated in screenshot 30.

User interface 22 further comprises commit button 43 that, when pressed, directs element manager 20 to invoke command generation module 14 to process the currently configured ordering and the updated ordering of a policy to produce a reduced set of commands that will conform the currently configured policy on the current one of elements 5 ("Edge Router 3") being managed to the updated ordering shown in screenshot 32. In response, element manager 20 sends ordered lists for both the currently configured ordering of unique identifiers for security policy rules 40 and the updated ordering of unique identifiers for security policy rules 40 to command generation module 14. Command generation module 14 converts the currently configured ordering to a source list and the updated ordering to a destination list and then feeds the source list and destination list to LCS module 15, which performs LCS-based command generation techniques described herein.

Figure 5:
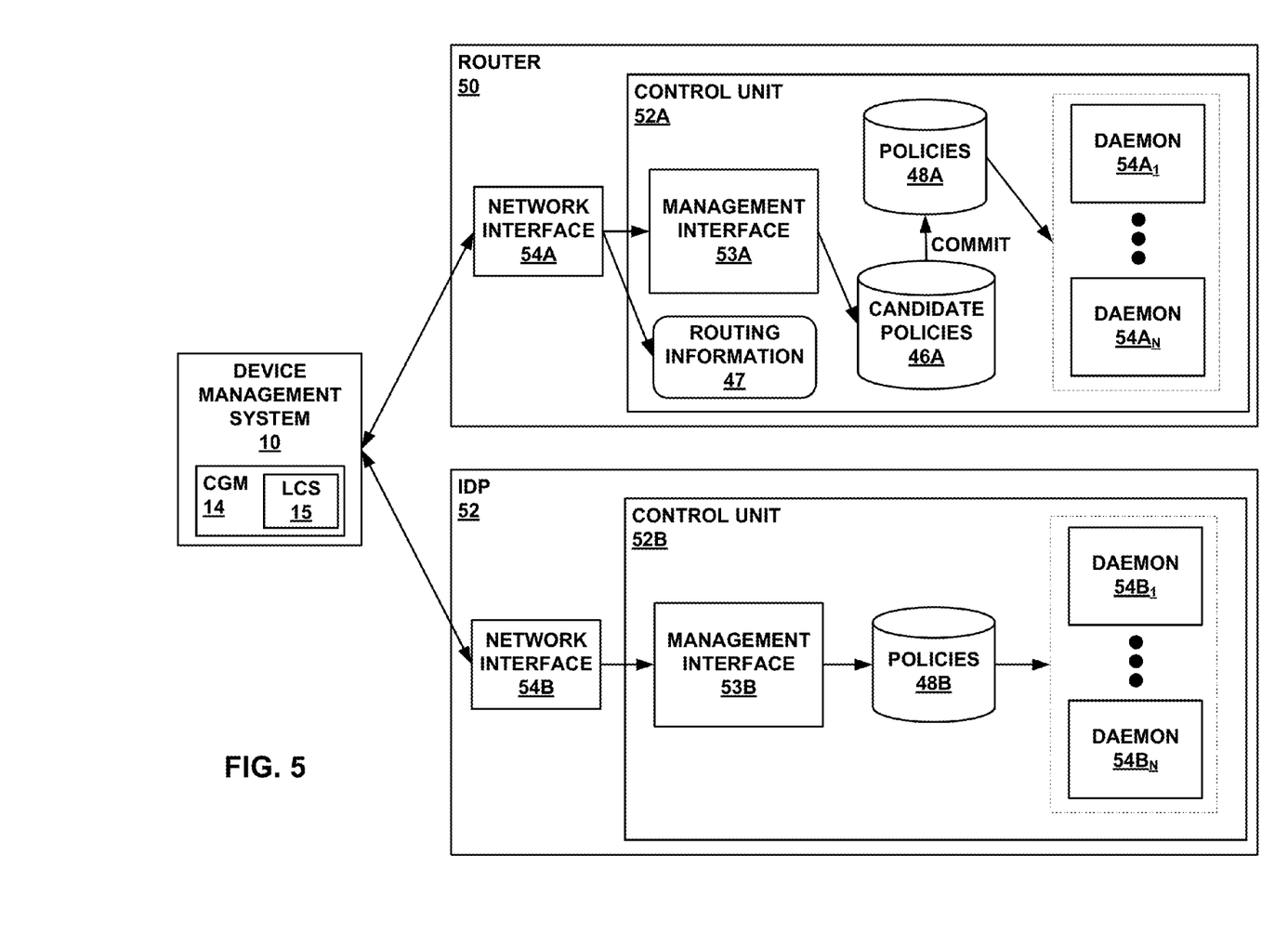
FIG. 5 is a block diagram illustrating, in further detail, two exemplary enterprise elements that receive commands for reordering a list of policy rules generated by a device management system according to the techniques described.

FIG. 5 is a block diagram illustrating, in detail, a router 50 and an intrusion detection and prevention device 52 ("IDP 52") that each receive commands for reordering a list of policy rules generated by device management system 10 according to the techniques described. Router 50 and IDP 52 may each represent one of elements 5 in the enterprise network 2 illustrated in FIG. 1.

Router 50 maintains routing information 47 that describes available routes through a network. Upon receiving an incoming data packet, the router examines header information within the packet to identify the destination for the packet. Based on the header information, the router accesses routing information 47, selects an appropriate route for the packet and forwards the packet accordingly. IDP 52 provides intrusion detection and prevention services for a network, such as enterprise network 2, and performs stateful inspection of application-layer data for packet flows between source devices and destination devices.

Router 50 and IDP 52 comprise a respective one of control units 52A and 52B that provide an operating environment for daemons 54$A_1$-54$A_N$ and 54$B_1$-54$B_N$ ("daemons 54"), which represent various software processes. Each of daemons 54 may comprise, for example, a routing protocol daemon, a device control daemon, a packet inspection daemon, a NAT daemon, a security daemon, or other type of application. Various embodiments of router 50 and IDP 52 may include more, fewer, or different daemons.

Router 50 and IDP 52 further comprise a respective one of policies 48A and 48B ("policies 48"). Policies 48 comprise policy configuration data for the respective device that includes policies to direct the operation of one or more of daemons 54. Daemons 54 that operate according to one or more policies in policies 48 execute the policy rules of the policies according to a specified ordering. As one example, policies 48B may include a security policy composed of security policy rules that direct the operation of daemon 54$B_1$. Each of policies 48 may maintain policy configuration data in the form of one or more tables, linked lists, databases, flat files, or any other data structure. Each of policies 48 may comprise a database server that accepts queries.

Router 50 and IDP 52 also include a respective one of management interfaces 53A and 53B ("management interfaces 53"), which exposes a set of functions by which a remote management device, e.g., device management system 10, may configure the device. Management interfaces 53 receive commands, via a respective one of network interfaces 54, from a remote management device that direct the management interfaces 53 to modify the associated one of policies 48. Exemplary management interfaces 53 accept the INSERT, DELETE, and MOVE [BEFORE|AFTER] policy management commands sent by device management system 10 and described above with respect to FIG. 2.

In response to receiving a policy management command, management interface 53B of IDP 52 modifies policies 48B by writing to, transmitting a database query to, or otherwise manipulating policies 48B to execute the command. Management interface 53B progressively modifies policies 48B one command at a time. Modifications to policies 48B take effect immediately. In some instances, management interface 53B may receive a number of commands that comprise a comprehensive policy update. Once management interface 53B executes the first command in such an update, IDP 52 may be operating in an intermediate state that may subject IDP 52 to indeterminate device behavior. IDP 52 may continue operating in this state until management interface 53B executes the final command in the update, at which time the policy update is complete.

Router 50 further comprises candidate policies 46A, which stores temporary policy configuration data for eventual publication to policies 48A. Candidate policies 46A may maintain policy configuration data in the form of one or more tables, linked lists, databases, flat files, or any other data structure. Candidate policies 46A may comprise a database server that accepts queries.

In response to receive a policy management command, management interface 53A of router 50 modifies candidate policies 46A writing to, transmitting a database query to, or otherwise manipulating candidate policies 46A to execute the command. In this example, after sending router 50 a set of policy management commands, device management system 10 sends a commit command to management interface 53B directing router 50 to publish temporary policy configuration data of candidate policies 46A to policies 48A. In response to a commit command, management interface 53B generates a patch by comparing changes made to candidate polices 46A with the policy configuration data of policies 46A. Management interface 53B applies the patch into policies 46A to complete the update.

Router 50 and IDP 52 receive policy management commands generated according to the techniques of this disclosure. As a result, router 50 and IDP 52 may receive fewer commands as compared to commands generated according to conventional techniques. For both router 50 and IDP 52, as well as other ones of elements 52, receiving fewer commands reduces the time required to perform management tasks, including handling network packets that contain commands, updating policies 48, maintaining configuration sessions with device management system 10. A reduction in the number of commands received may also decrease the likelihood of downtime caused by overburdening device resources, with concomitant gains in network performance. In addition, reducing the number of commands received may reduce the time spent, by IDP 52, in an indeterminate policy configuration state.

Figure 6A:
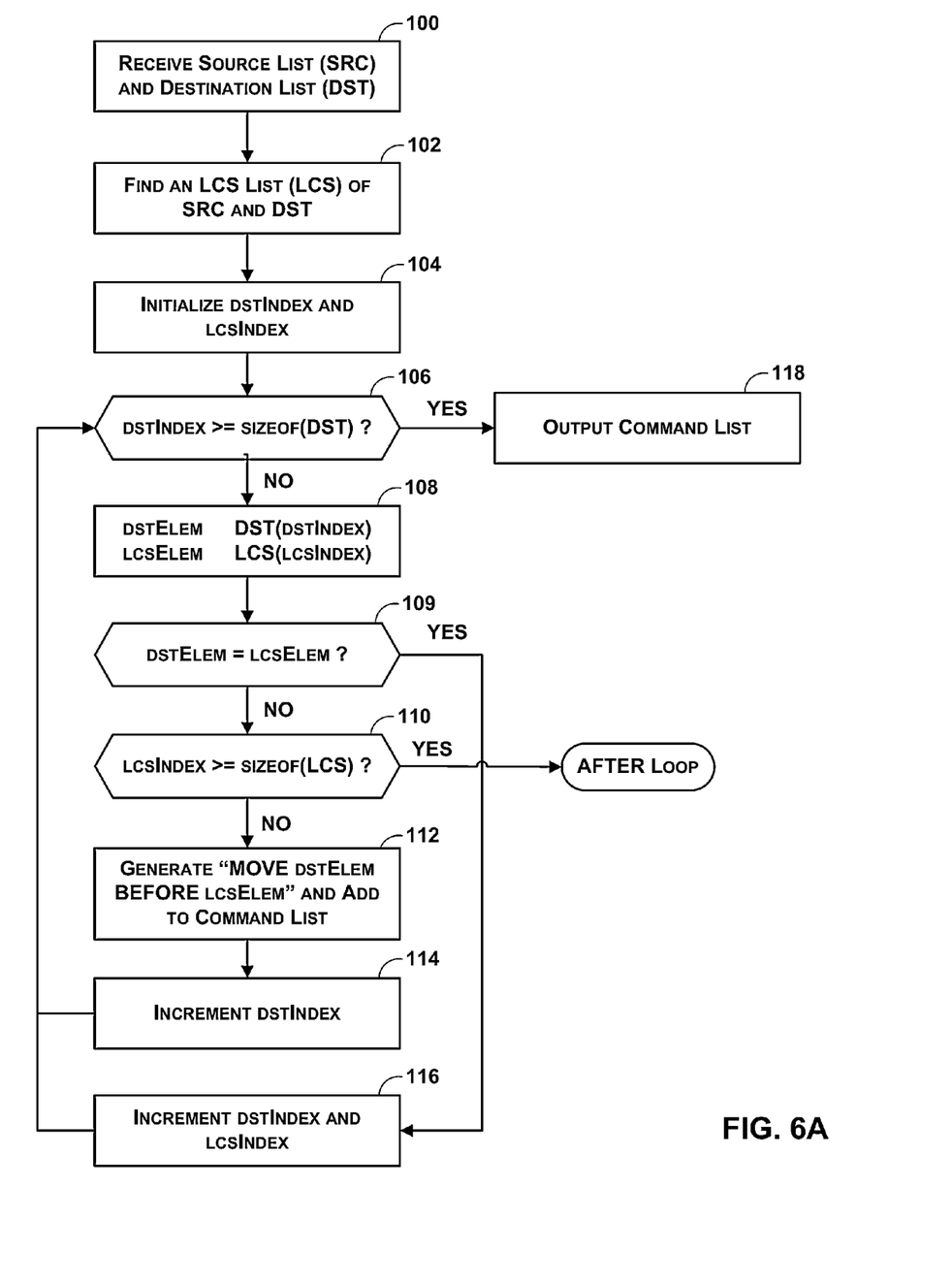
FIGS. 6A and 6B depict a flowchart illustrating an example mode of operation for a device management system that generates reorder commands in accordance with the techniques described.
Figure 6B:
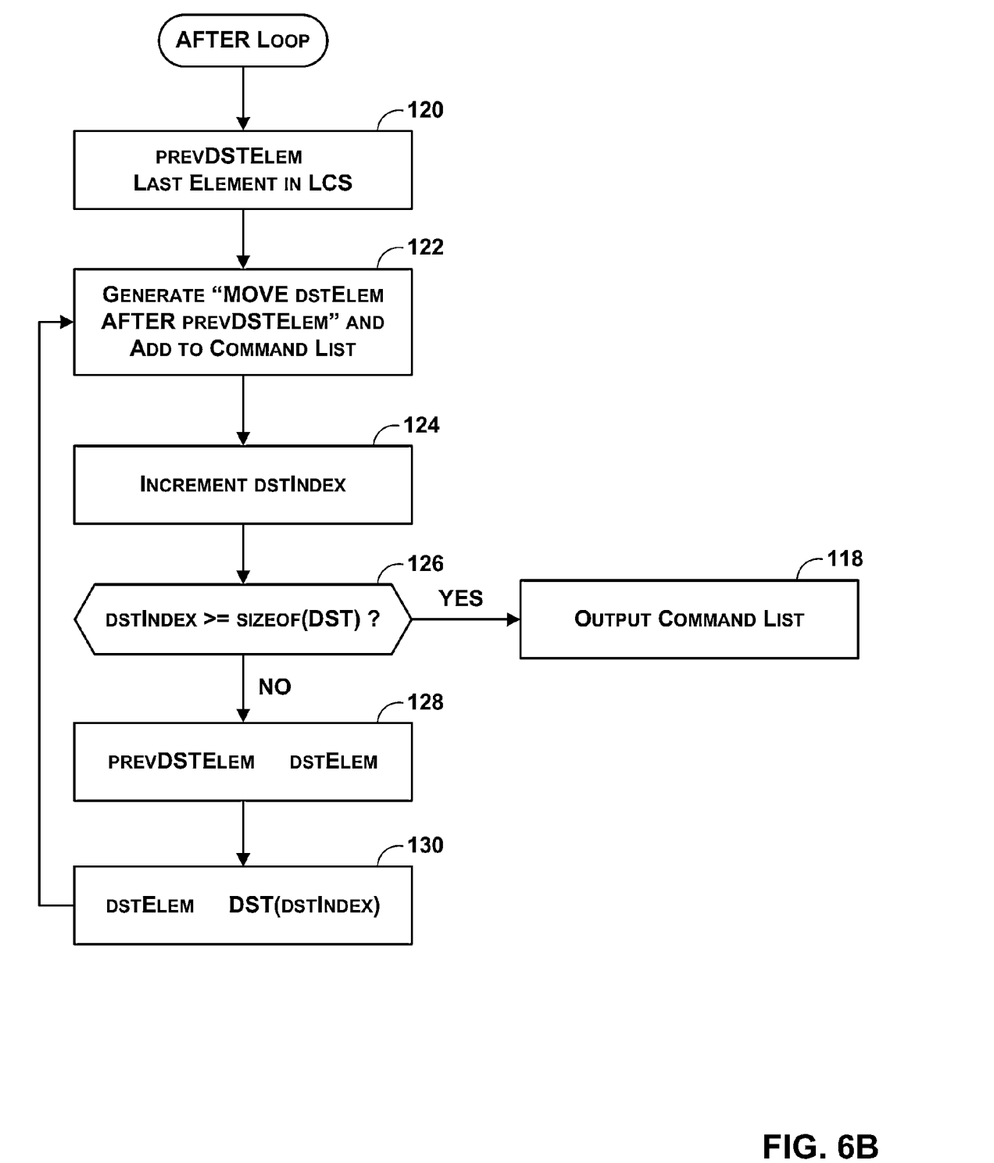

FIGS. 6A-6B depict a flowchart illustrating an example mode of operation for performing command generation techniques herein described. For purposes of explanation, the mode of operation is described with respect to LCS module 15 of device management system 10.

Initially, LCS module 15 receives a source list ("SRC") comprising unique policy rule identifiers, or elements, that identify policy rules in a currently configured policy for a managed device as well as a destination list ("DST") comprising the elements of the source list arranged in a different ordering that reflects an updated policy for the currently configured policy (100). LCS module 15 finds a list of elements that comprise a longest common subsequence of the source list and destination list (102) and maintains the longest common subsequence as a list of longest common subsequence elements ("LCS").

LCS module 15 iterates through the elements of DST and LCS using two iterators, dstIndex and lcsIndex, which LCS module 15 initializes to the initial indices of the DST and LCS, respectively (104). For each iteration through DST, LCS module 15 determines whether dstIndex has exceeded the bounds of DST (106). If so, LCS module 15 has handled each of the elements of DST and outputs the list of generated commands (YES branch of 106), in the order in which the commands were generated, to command generation module 14. Otherwise (NO branch of 106), LCS module 15 continues iterating through DST and LCS and sets two variables, dstElem and lcsElem, to the elements referenced by dstIndex in DST and lcsIndex in LCS, respectively (108). If lcsIndex has exceeded the bounds of LCS, LCS module 15 sets lcsElem to a null value (108).

LCS module 15 determines whether dstElem and lcsElem refer to the same identifier (109). If so (YES branch of 109), the rule identified by the identifier does not need to be moved. As a result, LCS module 15 generates no command and increments dstIndex and lcsIndex (116) in preparation for the next iteration.

If dstElem and lcsElem are different, however (NO branch of 109), then LCS module 15 determines whether lcsIndex has exceeded the bounds of LCS (110) and, if not (NO branch of 110), generates a command to move the rule identified by the value of dstElem before the rule identified by the value of lcsElem (112). In this example, the command takes the form "MOVE [dstElem] BEFORE [lcsElem]", where [dstElem] and [lcsElem] are placeholders for the values of dstElem and lcsElem at this step of the mode of operation. LCS module 15 adds the generated command to a next position in a command list. LCS module 15 also increments dstIndex in preparation for the next iteration (114) of the BEFORE loop.

Because the elements of LCS are the "pivot" around which LCS module 15 moves the elements of DST, if lcsIndex has exceeded the bounds of LCS (YES branch of 110), any additional commands are moved after the last element of the LCS. Accordingly, LCS module 15 sets a new variable, prevDSTElem to the last element of the LCS (120) in preparation of a new iterative loop (illustrated in FIG. 6B).

LCS module 15 generates a command to move the rule identified by the value of dstElem after the rule identified by the value of prevDSTElem (122). In this example, the command takes the form "MOVE [dstElem] AFTER [prevDSTElem]", where [dstElem] and [prevDSTElem] are placeholders for the values of dstElem and prevDSTElem at this step of the mode of operation. LCS module 15 adds the generated command to a next position in the command list. Next, LCS module 15 increments dstIndex (124) and tests whether dstIndex exceeds the bounds of DST (126). If so (YES branch of 126), LCS module 15 outputs the generated commands in the command list, in the order that the commands were generated, to command generation module 14. Otherwise (NO branch of 126), LCS module 15 sets prevDSTElem to dstElem (i.e., the previously used DST element) (128) and then sets dstElem to the DST element pointed to by dstIndex (130) in preparation for another iteration of the AFTER loop.

By generating policy management commands in this manner, LCS module 15 may reduce the number of commands needed to conform a currently configured policy to an updated policy.

The following is an exemplary application of the mode of operation for example LCS module 15 described with respect to FIGS. 6A-6B:

Initially, LCS module 15 receives a source list and a destination list from command generation module 14:

| SRC | [1 2 3 4 5] |
|---|---|
| DST | [3 5 1 4 2] |

LCS module 15 first determines an LCS for the source list (SRC) and destination list (DST). In this example, the determined LCS is:

| LCS | [1 4] |
|---|---|

LCS module 15 then iterates through SRC and LCS using the dstIndex and lcsIndex indices to set dstElem and lcsElem, which are denoted with underscores in SRC and LCS, respectively, in the following iteration tables:

BEFORE Loop Iteration 1

| DST | [<u>3</u> 5 1 4 2] |
|---|---|
| LCS | [<u>1</u> 4] |

Because dstElem and lcsElem are different and lcsIndex does not exceed the bounds of LCS, LCS module 15 generates a "MOVE 3 BEFORE 1" command and increments dstIndex.

BEFORE Loop Iteration 2

| DST | [3 <u>5</u> 1 4 2] |
|---|---|
| LCS | [<u>1</u> 4] |

Again, dstElem and lcsElem are different and lcsIndex does not exceed the bounds of LCS. LCS module 15 generates a "MOVE 5 BEFORE 1" command and increments dstIndex.

BEFORE Loop Iteration 3

| DST | [3 5 <u>1</u> 4 2] |
|---|---|
| LCS | [<u>1</u> 4] |

In this iteration, dstElem and lcsElem refer to the same identifier. As a result, LCS module 15 does not generate a command and increments dstIndex and lcsIndex.

BEFORE Loop Iteration 4

| | |
|---|---|
| DST | [ 3 5 1 4 2 ] |
| LCS | [ 1 4 ] |

Again, dstElem and lcsElem refer to the same identifier. As a result, LCS module 15 does not generate a command and increments dstIndex and lcsIndex.

After incrementing lcsIndex in BEFORE Loop Iteration 4, lcsIndex exceeds the bounds of LCS. The mode of operation for LCS module 15 therefore moves to the AFTER Loop and variable prevDSTElem (denoted with an asterisk (*)) is initialized to the last element of LCS:

| | |
|---|---|
| DST | [ 3 5 1 4 2 ] |
| LCS | [ 1 4* ] |

AFTER Loop Iteration 1

LCS module 15 begins AFTER Loop Iteration 1 by generating a "MOVE 2 AFTER 4" command. LCS module 15 then increments dstIndex and, because dstIndex now exceeds the bounds of LCS, LCS module 15 outputs the generated commands, in the order in which the commands were generated, to command generation module 14.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A network management device comprising:
a network interface that receives and sends network packets;
a command generation module that executes on a processor to generate one or more policy configuration commands for a managed network device, wherein the policy configuration commands direct the managed device to conform a currently configured policy for the managed device to an updated policy for the managed device, wherein the currently configured policy comprises a plurality of policy rules in a first ordering and the updated policy comprises the plurality of policy rules in a second ordering,
wherein the command generation module comprises a longest common subsequence module that determines a longest common subsequence of a source list comprising the plurality of policy rules in the first ordering and of a destination list comprising the plurality of policy rules in the second ordering, wherein the longest common subsequence is a longest subset of the plurality of policy rules that have a same ordering in both the source list and the destination list,
wherein the longest common subsequence module generates, for each policy rule of the plurality of policy rules that is not included in the longest common subsequence, a policy configuration command that, when executed by the managed network device, moves the policy rule relative to one of the plurality of policy rules that is included in the longest common subsequence;
an element manager that sends the policy configuration command generated for each policy rule of the plurality of policy rules that is not included in the longest common subsequence to the managed network device via the network interface.

2. The network management device of claim 1, wherein the longest common subsequence module iterates, according to the second ordering, through the plurality of policy rules in the destination list.

3. The network management device of claim 2,
wherein the longest common subsequence module iterates, according to the second ordering, through the plurality of policy rules in the destination list using a first iterator,
wherein the longest common subsequence module iterates, according to the second ordering, through the longest common subsequence using a second iterator, and
wherein the longest common subsequence module, to generate, for each policy rule of the plurality of policy rules that is not included in the longest common subsequence, a policy configuration command, generates a first policy configuration command to move a first policy rule referenced by the first iterator to a position before a second policy rule referenced by the second iterator when the first policy rule precedes the second policy rule in the second ordering and the first policy rule is not included in the longest common subsequence.

4. The network management device of claim 2,
wherein the longest common subsequence module iterates, according to the second ordering, through the plurality of policy rules in the destination list using a first iterator, and
wherein the longest common subsequence module, to generate, for each policy rule of the plurality of policy rules that is not included in the longest common subsequence, a policy configuration command, generates a policy configuration command to move a first policy rule referenced by the first iterator to a position after a second policy rule in the destination list when the first policy rule is subsequent to a third policy rule in the destination list, wherein the third policy rule is also the last policy rule in the longest common subsequence.

5. The network management device of claim 1, further comprising a user interface that enables a user to change the first ordering of the plurality of policy rules to the second ordering.

6. The network management device of claim 1, wherein each of the plurality of policy rules is associated with a unique identifier.

7. The network management device of claim 1, wherein the element manager sends the policy configuration commands to the managed network device via the network interface in an order in which longest common subsequence module generated the policy configuration commands.

8. The network management device of claim 1, wherein the longest common subsequence is not contiguous in one of the source list or the destination list.

9. A method comprising:
receiving an updated policy for a currently configured policy for a managed network device, wherein the currently configured policy comprises a plurality of policy rules in a first ordering and the updated policy comprises the plurality of policy rules in a second ordering;
determining a longest common subsequence of a source list comprising the plurality of policy rules in the first ordering and of a destination list comprising the plurality of policy rules in the second ordering, wherein the longest common subsequence is a longest subset of the plurality of policy rules that have a same ordering in both the source list and the destination list;
generating, for each policy rule of the plurality of policy rules that is not included in the longest common subsequence, a policy configuration command that, when executed by the managed network device, moves the policy rule relative to one of the plurality of policy rules that is included in the longest common subsequence; and
sending the policy configuration command generated for each policy rule of the plurality of policy rules that is not included in the longest common subsequence to the managed network device.

10. The method of claim 9, further comprising iterating, according to the second ordering, through the plurality of policy rules in the destination list.

11. The method of claim 10, further comprising:
iterating, according to the second ordering, through the plurality of policy rules in the destination list using a first iterator; and
iterating, according to the second ordering, through the longest common subsequence using a second iterator,
wherein generating, for each policy rule of the plurality of policy rules that is not included in the longest common subsequence, a policy configuration command comprises generating a first policy configuration command to move a first policy rule referenced by the first iterator to a position before a second policy rule referenced by the second iterator when the first policy rule precedes the second policy rule in the second ordering and the first policy rule is not included in the longest common subsequence.

12. The method of claim 10, further comprising:
iterating, according to the second ordering, through the plurality of policy rules in the destination list using a first iterator,
wherein generating, for each policy rule of the plurality of policy rules that is not included in the longest common subsequence, a policy configuration command comprises generating a first policy configuration command to move a first policy rule referenced by the first iterator to a position after a second policy rule in the destination list when the first policy rule is subsequent to a third policy rule in the destination list, wherein the third policy rule is also the last policy rule in the longest common subsequence.

13. The method of claim 9, wherein each of the plurality of policy rules is associated with a unique identifier.

14. The method of claim 9, further comprising sending the policy configuration command generated for each policy rule of the plurality of policy rules that is not included in the longest common subsequence to the managed network device in an order in which the policy configuration commands were generated.

15. The method of claim 9, wherein the longest common subsequence is not contiguous in one of the source list or the destination list.

16. A computer-readable storage medium comprising instructions for causing a programmable processor to:
receive an updated policy for a currently configured policy for a managed network device, wherein the currently configured policy comprises a plurality of policy rules in a first ordering and the updated policy comprises the plurality of policy rules in a second ordering;
determine a longest common subsequence of a source list comprising the plurality of policy rules in the first ordering and of a destination list comprising the plurality of policy rules in the second ordering, wherein the longest common subsequence is a longest subset of the plurality of policy rules that have a same ordering in both the source list and the destination list;
generate, for each policy rule of the plurality of policy rules that is not included in the longest common subsequence, a policy configuration command that, when executed by the managed network device, moves the policy rule relative to one of the plurality of policy rules that is included in the longest common subsequence; and
send the policy configuration command generated for each policy rule of the plurality of policy rules that is not included in the longest common subsequence to the managed network device.

17. The computer-readable storage medium of claim 16, wherein the longest common subsequence is not contiguous in one of the source list or the destination list.

* * * * *